United States Patent [19]

Yang et al.

[11] Patent Number: 5,917,819
[45] Date of Patent: Jun. 29, 1999

[54] REMAPPING OF ATM CELLS FOR MULTICAST TRANSMISSION

[75] Inventors: Bing Yang, Lee, N.H.; Andrew T. Hebb, Hudson, Mass.; Gregory Goss, Lowell, Mass.; Phil Malloy, Andover, Mass.

[73] Assignee: Cascade Communications Corp., Westford, Mass.

[21] Appl. No.: 08/638,117

[22] Filed: Apr. 26, 1996

[51] Int. Cl.[6] .................................................. H04L 12/56
[52] U.S. Cl. .......................... 370/390; 370/392; 370/395; 370/397; 370/419
[58] Field of Search ..................................... 370/389, 390, 370/392, 393, 395, 397, 399, 359, 419

[56] References Cited

U.S. PATENT DOCUMENTS

| | | | |
|---|---|---|---|
| 5,274,641 | 12/1993 | Shobatake et al. | 370/392 |
| 5,305,311 | 4/1994 | Lyles | 370/390 |
| 5,323,389 | 6/1994 | Bitz et al. | 370/397 |
| 5,325,356 | 6/1994 | Lyles | 370/397 |
| 5,327,420 | 7/1994 | Lyles | 370/397 |
| 5,392,402 | 2/1995 | Robrock, II | 395/200.57 |
| 5,394,397 | 2/1995 | Yanagi et al. | 370/390 |
| 5,400,325 | 3/1995 | Chatwanti et al. | 370/399 |
| 5,408,469 | 4/1995 | Opher et al. | 370/399 |
| 5,420,858 | 5/1995 | Marshall et al. | 370/352 |
| 5,436,893 | 7/1995 | Barnett | 370/392 |
| 5,457,687 | 10/1995 | Newman | 370/232 |
| 5,473,679 | 12/1995 | La Porta et al. | 379/201 |
| 5,479,401 | 12/1995 | Bitz et al. | 370/397 |
| 5,483,526 | 1/1996 | Ben-Nun et al. | 370/395 |
| 5,592,476 | 1/1997 | Calamvokis et al. | 370/390 |
| 5,666,361 | 9/1997 | Aznar et al. | 370/392 |
| 5,671,222 | 9/1997 | Chen et al. | 370/388 |
| 5,684,797 | 11/1997 | Aznar et al. | 370/390 |
| 5,689,506 | 11/1997 | Chiussi et al. | 370/388 |
| 5,701,300 | 12/1997 | Jeon et al. | 370/392 |

*Primary Examiner*—Min Jung
*Attorney, Agent, or Firm*—Weingarten, Schurgin, Gagnebin & Hayes LLP

[57] ABSTRACT

Improved methods and apparatus are disclosed for remapping Asynchronous Transfer Mode ("ATM") cells in an ATM switch to convert a single Virtual Path Identifier ("VPI")/Virtual Connection Identifier ("VCI") address pair to multiple outgoing VPI/VCI pairs for multicast transmission. An incoming cell is examined to determine the ports through which the cell will exit and a local header is generated which includes a field specifying the I/O modules ("IOMs") through which the cell will exit. The VPI/VCI pair of an incoming multicast cell is mapped to a global multicast identifier ("MID") which is written into the local header. The cell, including the local header is then forwarded to the IOMs specified in the header. A first lookup table on each IOM is employed to provide a port bitmask indexed by MID to direct the cell to the previously identified ports, and to map the MID into a connection identifier ("CID"). A second lookup table is employed to map the CID provided from the first table to a destination VPI/VCI. The second table is shared among all ports on the IOM. Memory utilization efficiency is improved by using global MIDs and by distinguishing multiport-multicast cells from single-port-multicast cells. If the cell is being sent to a single port within the IOM then a single location is allocated in the second table. If the cell is being sent to multiple ports within the IOM then multiple locations are allocated within the second table.

22 Claims, 5 Drawing Sheets

| BIT POSITION | | | | | | | | OCTET |
|---|---|---|---|---|---|---|---|---|
| 7 | 6 | 5 | 4 | 3 | 2 | 1 | 0 | |
| IOM:15 | IOM:14 | IOM:13 | IOM:12 | IOM:11 | IOM:10 | IOM:9 | IOM:8 | 1 |
| IOM:7 | IOM:6 | IOM:5 | IOM:4 | IOM:3 | IOM:2 | IOM:1 | IOM:0 | 2 |
| MC | PATH | QoS:3 | QoS:2 | QoS:1 | QoS:0 | ATMizer | DIR | 3 |
| OAM PM | OAM | RES | RES | RES | RES | CID:13 | CID:12 | 4 |
| CID:11 | CID:10 | CID:9 | CID:8 | CID:7 | CID:6 | CID:5 | CID:4 | 5 |
| CID:3 | CID:2 | CID:1 | CID:0 | VCI:15 | VCI:14 | VCI:13 | VCI:12 | 6 |
| VCI:11 | VCI:10 | VCI:9 | VCI:8 | VCI:7 | VCI:6 | VCI:5 | VCI:4 | 7 |
| VCI:3 | VCI:2 | VCI:1 | VCI:0 | PT:2 | PT:1 | PT:0 | CLP | 8 |
| PAYLOAD BYTE1 | | | | | | | | 9 |
| PAYLOAD BYTE2 | | | | | | | | 10 |
| PAYLOAD BYTE3 | | | | | | | | 11 |
| • | | | | | | | | • |
| • | | | | | | | | • |
| • | | | | | | | | • |
| PAYLOAD BYTE48 | | | | | | | | 56 |

*FIG. 2* Unicast Cell Format

| BIT POSITION | | | | | | | | OCTET |
|---|---|---|---|---|---|---|---|---|
| 7 | 6 | 5 | 4 | 3 | 2 | 1 | 0 | |
| IOM:15 | IOM:14 | IOM:13 | IOM:12 | IOM:11 | IOM:10 | IOM:9 | IOM:8 | 1 |
| IOM:7 | IOM:6 | IOM:5 | IOM:4 | IOM:3 | IOM:2 | IOM:1 | IOM:0 | 2 |
| MC | PATH | QoS:3 | QoS:2 | QoS:1 | QoS:0 | ATMizer | DIR | 3 |
| OAM PM | OAM | RES | RES | RES | RES | M-ID:13 | M-ID:12 | 4 |
| M-ID:11 | M-ID:10 | M-ID:9 | M-ID:8 | M-ID:7 | M-ID:6 | M-ID:5 | M-ID:4 | 5 |
| M-ID:3 | M-ID:2 | M-ID:1 | M-ID:0 | VCI:15 | VCI:14 | VCI:13 | VCI:12 | 6 |
| VCI:11 | VCI:10 | VCI:9 | VCI:8 | VCI:7 | VCI:6 | VCI:5 | VCI:4 | 7 |
| VCI:3 | VCI:2 | VCI:1 | VCI:0 | PT:2 | PT:1 | PT:0 | CLP | 8 |
| PAYLOAD BYTE1 | | | | | | | | 9 |
| PAYLOAD BYTE2 | | | | | | | | 10 |
| PAYLOAD BYTE3 | | | | | | | | 11 |
| • | | | | | | | | • |
| • | | | | | | | | • |
| • | | | | | | | | • |
| PAYLOAD BYTE48 | | | | | | | | 56 |

*FIG. 3* Multicast Cell Format

REMAPPING OF ATM CELLS FOR MULTICAST TRANSMISSION

FIELD OF THE INVENTION

This invention relates to telecommunications, and more particularly to multicasting in an ATM switch.

BACKGROUND OF THE INVENTION

The basic communication unit within the Asynchronous Transfer Mode ("ATM") protocol is the cell. An ATM cell is 53 octets in length, and includes a header and a payload. The cell header occupies 5 octets, and the remaining 48 octets are reserved for the payload. The cell destination is identified by a Virtual Path Identifier/Virtual Connection Identifier ("VPI/VCI") located in the header. The VPI is either 8 or 12 bits in length, depending on whether the link is a Network to Network Interface ("NNI") or a User Network Interface ("UNI"). The VCI is 16 bits in length. Thus, the VPI and VCI collectively provide a 24 or 28 bit address.

Supporting the total number of connections defined by the VPI/VCI address space would be impractical for most commercial ATM switch applications due to large memory requirements and attendant costs. For this reason, it is common practice to translate the VPI/VCI address space to a smaller address space by address translation techniques. In typical ATM switches, the incoming VPI/VCI address is translated into a smaller, local address space whose width defines the number of connections supported by the switch. The cell is directed to one or more ports within the switch based on the local address. In an output process, a remapping is executed to define an outgoing VPI/VCI address for the cell.

Remapping the outgoing VPI/VCI becomes memory intensive when supporting multicast operation since a single incoming VPI/VCI may spawn multiple VPI/VCIs for transmission. For example, if an ATM switch includes 14 IOMs, each having 8 I/O ports, it is possible that one input may spawn 112 outputs. It is theoretically possible to employ a lookup table at each port to remap the outgoing address to the proper destination VPI/VCI. However, such an architecture would be impractical since it would require an inordinately large amount of memory. A more efficient technique for handling multicast cells would therefore be of benefit.

SUMMARY OF THE INVENTION

Improved methods and apparatus are disclosed for remapping Asynchronous Transfer Mode ("ATM") cells in an ATM switch to convert a single Virtual Path Identifier/Virtual Connection Identifier ("VPI/VCI") address to multiple outgoing VPI/VCIs for multicast transmission. When a multicast cell enters the switch through an I/O module ("IOM"), the cell VPI/VCI is mapped to a smaller, local address, i.e., multicast identifier ("MID"), which is copied to the cell header. The cell is then forwarded to the appropriate IOMs for transmission. The IOMs each have a first lookup table for providing a port bitmask, and a connection identifier ("CID") in response to the cell MID. The IOMs also have a second lookup table for providing a VPI/VCI in response to the CID and, in the case of a multiport-multicast cell, in response to the port CID plus the port identification, i.e., the CID and the port identification are added to provide an address value. The IOM's advantageously distinguish multiport-multicast cells from single-port-multicast cells, and allocate a single location in the second table if the cell to be transmitted is a single-port-multicast cell.

Efficient use of the second lookup table memory resource is achieved by determining when a single location will suffice for a multicast cell and only allocating memory for such entry in that event. Within an IOM, a multicast cell could require broadcasting from as many ports as are supported in the IOM, and as few as a single port. The IOM is not implicated if the cell will not exit through any part of the respective IOM. Multicast cells which require only one location are distinguished from multicast cells which require more than one location, and locations are allocated accordingly. Thus, memory resource usage efficiency is improved and a single second lookup table may be advantageously shared by all of the ports on the IOM.

In addition to reducing memory requirements cell traffic within the switch is reduced. The present invention assigns global MIDs to multicast cells as the cells enter the switch. Individual VPI/VCI destination pairs for the multicast cells are not assigned until after the multicast cell enters the respective IOM for retransmission through one or more ports. As such, the breakout of multicast offspring is delayed until the cell reaches a point where switch traffic is not significantly affected.

BRIEF DESCRIPTION OF THE DRAWING

The invention will be more fully understood by reference to the following detailed description and drawing of which:

FIG. 2 illustrates a unicast cell;

FIG. 3 illustrates a multicast cell;

DETAILED DESCRIPTION OF THE DRAWING

Figure 1:
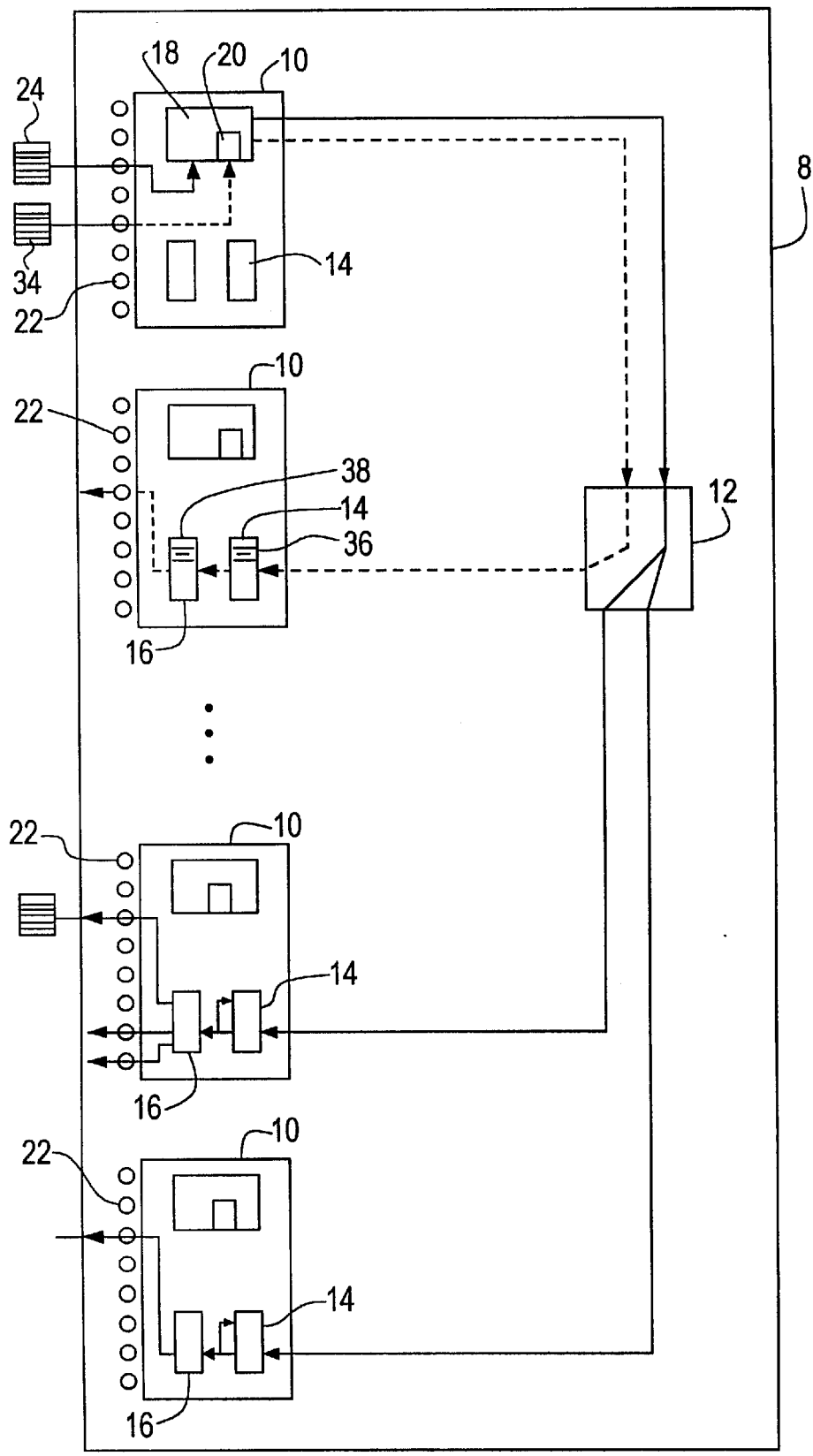
FIG. 1 is a block diagram of an ATM switch in accordance with the present invention.
Figure 4:
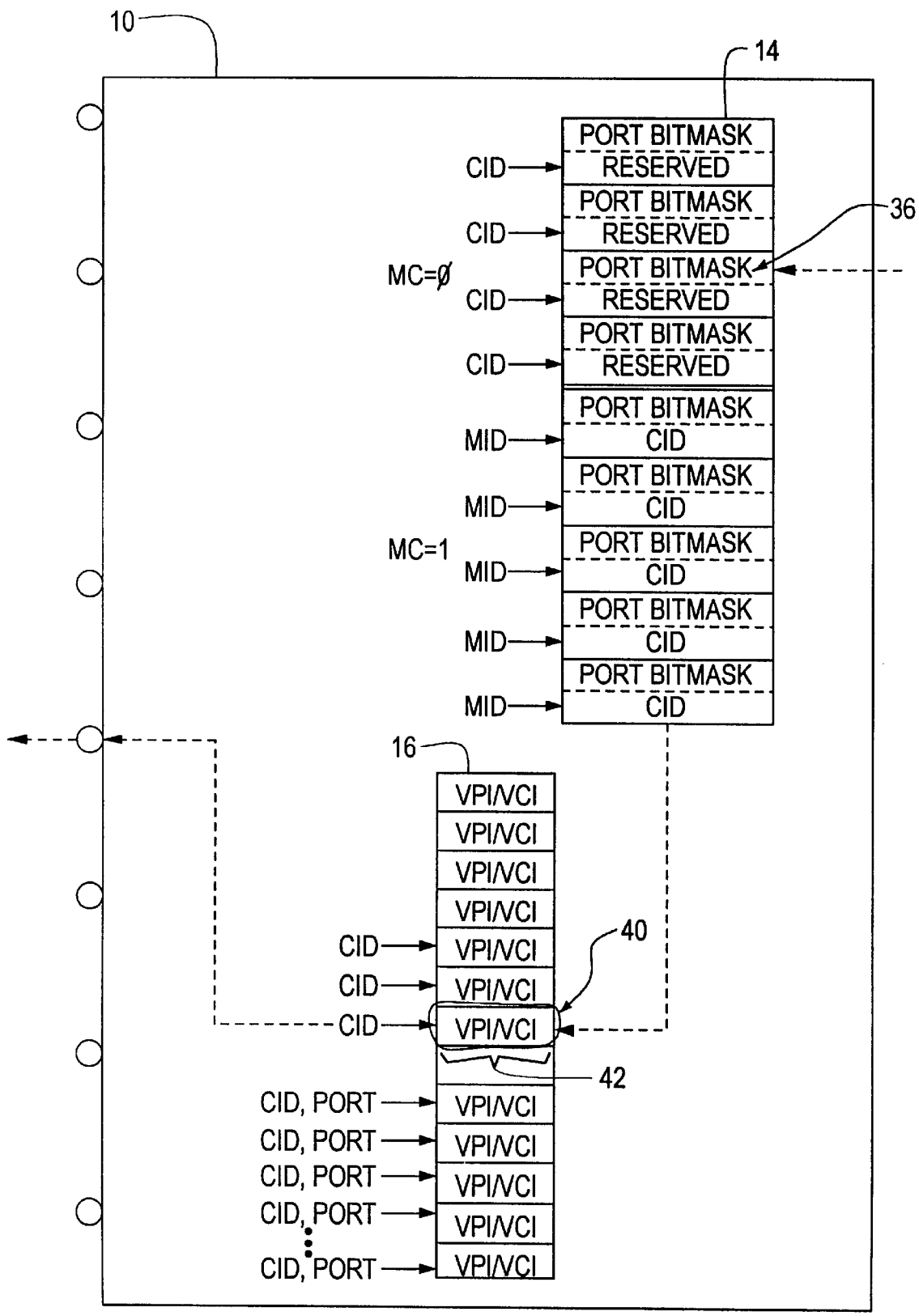
FIG. 4 illustrates an IOM in unicast operation.

FIG. 1 illustrates an Asynchronous Transfer Mode ("ATM") switch 8 for transmission of ATM cells. The switch includes fourteen input output modules ("IOMs") 10 and a switching fabric 12. The IOMs each include a 64k×16 bit RAM CID/bitmask lookup table 14, a 128k×32 bit RAM output translation lookup table 16 and an incoming cell translation circuit 18 with an identifier lookup table 20. Each IOM includes eight I/O ports 22 through which ATM cells may enter and exit the switch. In operation, cells enter the switch through an IOM port 22, are transmitted to the switching fabric 12, and are subsequently selectively directed to one or more of the IOMs for transmission out of the switch through one or more ports of selected IOM's.

Referring now to FIGS. 1, 2 and 3, when an ATM cell, e.g. multicast cell 24, enters the switch, the cell VPI/VCI address is translated to a 14 bit address corresponding to the number of multicast ID's (MID) supported in the present embodiment. This translation may occur via the technique disclosed in application Ser. No. 08/639,228 filed on Apr. 26, 1996 the same date as the present application, entitled ATM ADDRESS TRANSLATION METHOD AND APPARATUS, of the present assignee, which is incorporated herein reference or by any other suitable technique known in the art. The MID is placed in a local header 26 which is attached to the ATM cell. Based on the incoming VPI/VCI, management software determines whether the cell will exit the switch through a single port, i.e., the cell is unicast, or whether the cell will exit the switch through multiple ports, i.e., the cell is multicast, and sets up the lookup tables 14, 16 accordingly. More particularly, in the event that the multicast cell is a multiport multicast cell, 8 locations are allocated in table 16 for destination VPI/VCI addresses, i.e. one for each port on the respective IOM even though in the usual case, all ports will not be implicated in the multicast transmission The local header includes a fourteen bit identifier field 28, a sixteen bit IOM field 30 and a multicast bit ("MC bit") 32. In the case of a unicast cell 34, the identifier field contains a 14 bit connection identifier ("CID"). In the case of the multicast cell 24, as indicated above the identifier field contains a global multicast identifier ("MID"). The CID and MID are based on the VPI/VCI of the incoming cell and ascertained via reference to an identifier lookup table 20 in the translation circuit 18. The presently disclosed switch supports 16k CIDs per IOM and 16k MIDs per switch although it should be appreciated that the special number of multicast and connector ID's supported in a given switch is a matter of design choice.

One IOM corresponds to each of the IOM bits identified in FIG. 3. The IOM bits constitute a bitmask and a specific IOM bit set upon a determination that a multicast transmission will involve the respective IOM. For example, if a multicast cell were to be transmitted out of ports 1 and 5 of one IOM (IOM:1) and was also to be transmitted out of a port in a second IOM (IOM:5), the bits IOM:1 and IOM:5 would be set.

The MC bit 32 is set to "1" if the cell is multicast, and to "0" if the cell is unicast.

Upon receipt of a unicast cell, following generation of the local header in the translation circuit 18, the cell is transmitted to the switching fabric 12. The switching fabric 12, then directs the cell to the appropriate IOM. A port bitmask 36 is obtained from the first IOM lookup table 14, which is indexed by the CID. The port bitmask identifies the specific port within the IOM for transmittal of the respective cell. A new VPI/VCI 40 is retrieved from the output translation table 16, using the CID to index the translation table 14. One location 42 in the table 16 is allocated for the unicast cell by the management software. The destination VPI/VCI is then written into the header of the cell, and the cell is transmitted from the selected port.

Figure 5:
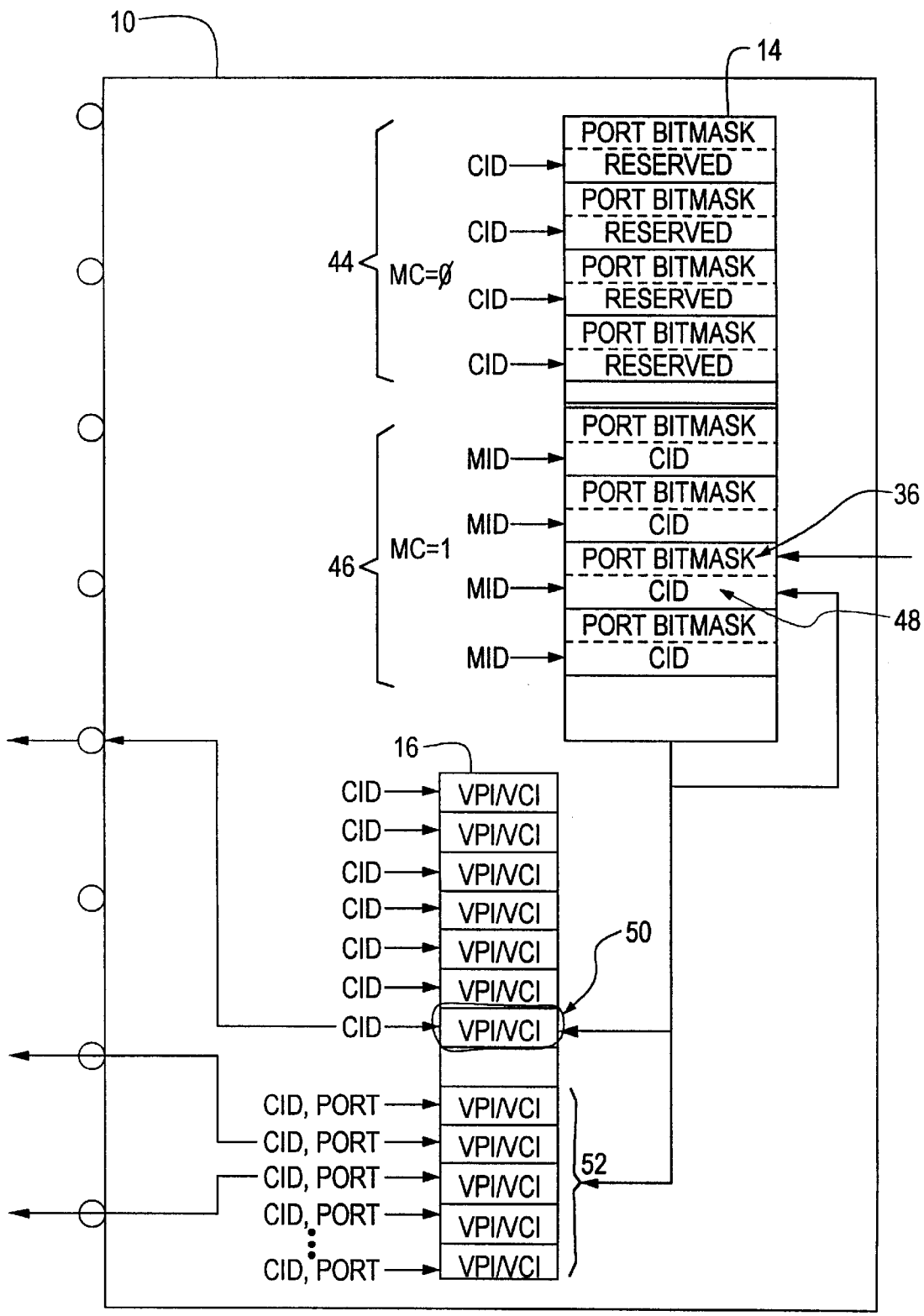
FIG. 5 illustrates an IOM in multicast operation.

As shown in FIGS. 1 and 5, multicast cells are directed through the switch to multiple ports in a manner which efficiently utilizes memory resources and minimizes traffic internal to the ATM switch. More specifically, following the generation of the local header illustrated in FIG. 3, the multicast cell 24 is transmitted to the switching fabric 12. The switching fabric 12 then directs the multicast cell to each IOMs for which the corresponding IOM bit 30 is set in the multicast cell header. Since the cell is a multicast cell, a possibility exists that one of more than one IOM bit may be set with the cell header. In particular, if the cell is a multicast cell which is to be transmitted by more than one port on a single IOM only a single IOM bit would be set in the multicast cell header. If the cell is a multicast cell which is to be transmitted by ports on more than one IOM, plural IOM bits would be set in the multicast cell header.

Upon receipt of the multicast cell at the respective IOM's for which the IOM bits are set in the multicast cell header, the CID/bitmask lookup table 14 is indexed using the MID to locate the port bitmask 36 which identifies the appropriate ports within the IOM from which the multicast cell will be transmitted. The CID/bitmask table 14 is divided into two 32k sections 44, 46. The first section 44 contains paired port bitmask/reserved entries indexed by CID. The second section 46 contains paired port bitmask/CID entries indexed by MID. The MID is used as an index to get the port bitmask and CID from the second section 46 in two read operations. The CID 48 which is overlaid on the MID in the local header. In the case of multicast cell which is destined for only a single port on an IOM (single-port-multicast cell), at least one of the three least significant bits ("LSBs") of the new CID is non-zero. In the case of a multicast cell which is destined for more than one port on the respective IOM (multiport multicast cell), each of the LSBs is a logic "0." The multicast cell is forwarded to the appropriate port or ports specified in the port bitmask 36.

Using the MID for multicast cells reduces traffic within the switch by delaying multicast cell breakout. Individual VPI/VCI destination pairs for the multicast cells are not assigned until after the multicast cell enters the respective IOM for retransmission through one or more ports. As such, the breakout of multicast offspring is delayed until the cell reaches a point where switch traffic is not significantly affected. That is, a single global multicast cell is employed up until the outgoing IOM is reached.

The output translation table 16 is next employed to identify the proper destination VPI/VCI for the multicast cell at the respective port. Significantly, only one location 50 is allocated in the output translation table 16 if the multicast cell is being transmitted from only one port within the IOM ("single-port-multicast"), and a plurality of locations 52 are allocated in the output translation table if the multicast cell is being outputted through multiple ports within the IOM ("multiport-multicast"). In a preferred embodiment, the number of locations allocated in the event of a multiport multicast is equal to the number of ports supported by the IOM. In practice, this allocation technique substantially reduces the size of the output translation table 16 which is required since many multicast cells comprise single port multicast cells.

The LSBs serve as a prompt for single-port-multicast cells to index into the output translation table 16 directly by CID since the index into the table has a non-zero ending, and a prompt for multiport-multicast cells to index into the table by both CID and port since the index into the table has a zero ending. For example, if the CID were (00000001010001), then the table would be indexed directly at 81 (decimal). However, if the CID were (00000001010000), then the table would be indexed: 80, 81, 82, 83 . . . 87 (decimal). In the present embodiment, single-port-multicast locations are allocated starting at the top of the table, and multiport-multicast locations are allocated starting at the bottom of the table.

As indicated above, in the present In this embodiment the number of locations allocated for multiport-multicast cell equal to the number of ports on the IOM, i.e., 8 although it should be appreciated that the number of ports provided on an IOM is a matter of design choice.

The destination VPI/VCI address for the respective multicast cell is obtained from the output translation table 16 based on the local CID and the port identification. Distinguishing multiport-multicast cells from single-port-multicast cells and allocating locations in a single output translation table which is shared among the ports on an IOM thus provides substantial memory savings, reduced product cost and improved reliability of the overall system.

Figure 6:
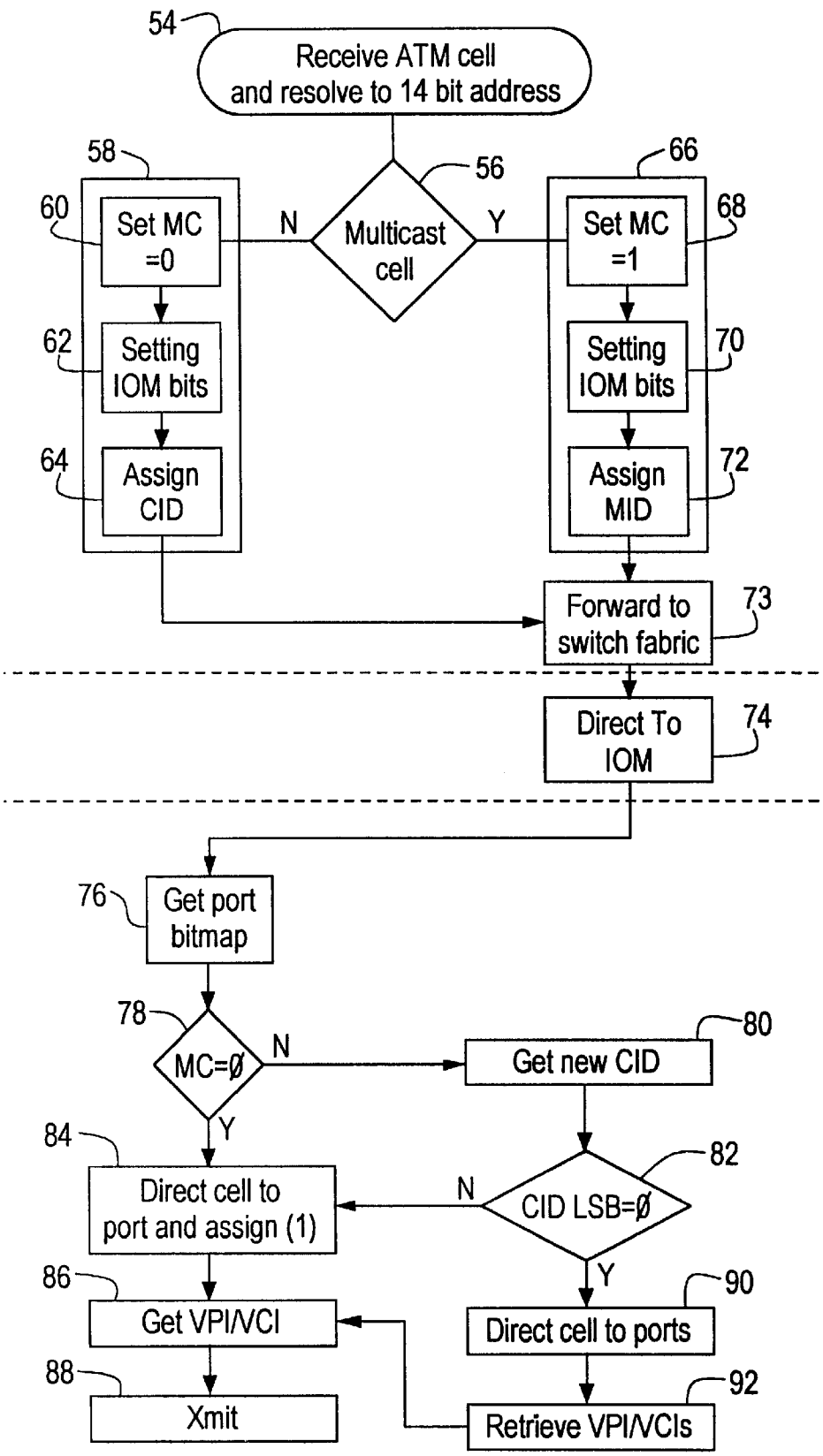
FIG. 6 is a flow chart which illustrates a method for remapping of ATM cell for multicast transmission.

FIG. 6 is a flow chart which further illustrates the above described technique for handling multicast cells within an ATM switch. In a receiving step 54 the ATM cell is received in the switch and the received VPI/VCI is translated into a 14 bit address representing one of 16K connections supported by the switch. In an identification step 56 the cell is identified as either a unicast cell or multicast or a multicast cell.

If the cell is a unicast cell, then the local header is generated in a generating step 58 which comprises substeps 60, 62 and 64. More specifically, the generation of the cell header (see FIG. 2) for a unicast cell includes the steps of setting the MC bit to "0" within the header in a step 60 to identify the cell as a unicast cell, setting the appropriate IOM bit within the cell header which will be responsible for retransmission of the cell as illustrated in step 62 and assigning a 14 bit global CID which identifies one of 16K connections supported by the switch as illustrated in step 64.

If the result of the identification step 56 results in the determination that the cell is a multicast cell, the MC bit in the multicast cell header (See FIG. 3) is set to indicate that the cell is a multicast cell as illustrated in step 68, the appropriate IOM bits are set in the multicast cell header corresponding to those IOM's which will be called upon to retransmit the multicast cell as illustrated in step 70 and a 14 bit global multicast ID (MID) is stored in the MID header field to identify the multicast ID as one of 16K global multicast ID's supported by the ATM switch as illustrated in step 72.

The cell, be it a unicast cell or a multicast cell is next forwarded to the switch fabric 12 as illustrated in step 73. Thereafter, as illustrated in step 74, the cell is forwarded by the switch fabric to the specific IOM's for which the IOM bits are set in the cell header. In the case of a unicast cell, the cell will be forwarded to a single IOM. In the case of a multicast cell, the cell will be forwarded to one or more IOM's.

Upon receipt by the respective IOM(s) 10, a port bitmask is obtained by indexing into the CID/port bitmask lookup table as illustrated in step 76 using the global MID/CID as applicable. The port bitmask indicates the port or ports within the cell will need to transmit the cell to the destination VPI/VPI.

Once the port bitmask is obtained, unicast, single-port-multicast and multiport multicast cells are handled differently. If the cell is unicast cell as determined in step 78, the cell is sent to the appropriate port specified in the port bitmask as illustrated in step 84. The destination VPI/VCI is then retrieved from the output translation lookup table 16 as illustrated in step 86 and the destination VPI/VCI is stored in the cell header of the outgoing ATM cell. The cell is next transmitted out of the respective port of the IOM within the switch as illustrated in step 88.

If the MC bit indicates that the cell is a multicast cell as determined in step 78, then the lookup table 14 is accessed using the MID as an index as illustrated in step 80 to retrieve a local CID and a port bitmask as illustrated in step 80. The local CID is then overwritten on the MID within the multicast cell header.

As illustrated in step 82, the cell header is next tested to ascertain whether the cell is a multiport multicast or a single port multicast cell. The cell header is tested by checking for a non-zero bit in the three LSB's of the CID. If the three LSB's of the CID are each "0," then the cell is multi-port-multicast; otherwise the cell is single-port-multicast. If the cell is single-port multicast cell, then the cell is directed to the port indicated by the port bitmask as illustrated in step 84 and the appropriate VPI/VCI destination address is retrieved from the output translation table 16 as illustrated in step 86 using the local CID as an index prior to transmission of the cell as illustrated in step 88. If the cell is a single port multicast cell, only a single location within the output translation table is employed.

If the testing of the 3 LSB's of the local CID in step 82 indicates that the cell is multiport-multicast cell, then the cell is directed 90 to the appropriate ports based on the port bitmask retrieved from the MID/port bitmask lookup table 14. The VPI/VCIs are then retrieved in step 92. In the event that the multicast cell is a multiport multicast cell, then eight locations will have been allocated as described above for destination VPI/VCI addresses, i.e. one for each port on the respective IOM even though in the usual case, all ports will not be implicated in the multicast transmission. It should be appreciated by those of ordinary skill in the art given the above disclosure that a number of locations corresponding to the number of ports implicated in the transmission could be allocated for destination VPI/VCI addresses thereby effecting even greater memory savings.

As illustrated in step 86 for a multiport multicast cell, the destination VPI/VCI's are retrieved from the output translation lookup table 16 using the local CID and the port identification as an index for each cell being transmitted from the respective ports and the VPI/VCI address is then written into the respective cell header. The cells are then transmitted from the respective ports to the respective destination VPI/VCI's as illustrated in step 88.

It will be understood that various changes and modifications to the above described method and apparatus may be made without departing from the inventive concepts disclosed herein. Accordingly, the present invention is not to be viewed as limited except as by the scope and spirit of the appended claims.

What is claimed is:

1. A method for dispatching multicast cells from a network switch having a plurality of I/O modules ("IOMs") comprising the steps of:

receiving a data cell at one of said plurality of IOMs of said network switch;

in the event said data cell is to be multicast to a plurality of destination addresses, identifying said cell as a multicast cell;

in the event of a multicast cell, generating a cell header which includes an identification of each IOM in the network switch to which the cell is to be directed and a multicast identification ("MID") corresponding to one of N multicast identification numbers supported by the switch;

directing the multicast cell to each of the IOMs specified in the cell header;

at each IOM specified in the cell header, indexing into a port selection lookup table to ascertain an identification number of the ports of the respective IOM to which the multicast cell is to be directed and a local identification number corresponding to one of N local connection identifications supported by the switch;

for each port to which the multicast cell is to be directed, indexing into an output translation lookup table using said local identification number to ascertain a destination address for the multicast cell at the respective port and transmitting the multicast cell from the respective port to the respective destination address.

2. The method of claim 1 including determining, with regard to each IOM specified in the cell header, whether the multicast cell is multiport-multicast or single-port-multicast.

3. The method of claim 2 including allocating a single location for a VPI/VCI in the output translation lookup table of each IOM specified in the cell header in which the multicast cell is single-port-multicast.

4. The method of claim 3 including allocating multiple locations for a plurality of VPI/VCI pairs in the output translation lookup table of each IOM specified in the cell header in which the multicast cell is multiport-multicast.

5. The method of claim 4 including allocating a location for each port on each IOM specified in the cell header.

6. The method of claim 5 wherein generating the cell header includes assigning a global multicast identifier ("MID") in the event of a multicast cell.

7. The method of claim 5 wherein generating the cell header includes setting a multicast bit to indicate whether the cell is multicast.

8. The method of claim 7 wherein determining with regard to each IOM specified in the cell header whether the multicast cell is multiport-multicast or single-port-multicast includes checking the multicast bit to determine whether the cell is multicast and checking the least significant bit of the local identifier to determine whether the cell is single-port or multiport with regard to each IOM specified in the cell header.

9. A method of remapping cells in a switch to convert a single connection identifier address pair to multiple connection identifier address pairs for multicast transmission, comprising:
   generating a local header for each cell;
   separating multicast cells from unicast cells;
   separating single-port-multicast cells from multiport-multicast cells; and
   allocating an output translation table location for each single-port-multicast cell.

10. The method of claim 9 wherein said generating step includes generating a multicast ("MC") bit which, when set, indicates that the cell is a multicast cell.

11. The method of claim 10 wherein said generating step further includes generating an IOM field which indicates I/O modules for output transmission of the cell.

12. The method of claim 11 wherein said generating step further includes generating a local connection identifier field representing a destination for the cell.

13. The method of claim 12 wherein generating said local connection identifier field includes generating a CID for each unicast cell.

14. The method of claim 13 wherein generating said local connection identifier field includes generating an MID for each multicast cell.

15. The method of claim 12 wherein separating multicast cells from unicast cells includes testing said MC bit.

16. The method of claim 15 wherein separating single-port-multicast cells from multiport-multicast cells includes testing the least significant bit of the local connection identifier.

17. The method of claim 16 including a further step of allocating a plurality of translation table locations for each multiport-multicast cell.

18. A switch for receiving and transmitting cells, comprising:
   a switching fabric; and
   a plurality of input/output modules ("IOMs") connected to said switching fabric, each said IOM including a plurality of ports, an incoming cell translation circuit, a connection identifier ("CID")/bitmask lookup table and an output translation lookup table,
   said incoming cell translation circuit operative to provide a multicast bit indicating whether a cell is multicast;
   a local connection identifier in response to a VPI/VCI of a received cell, said connection identifier being a CID in the case of a unicast cell and a multicast identifier ("MID") in the case of a multicast cell; and
   IOM bits indicating which IOM or IOMs the cell is destined for;
   said switching fabric directing the cell to IOMs for which said IOM bits are set;
   said CID/bitmask lookup table providing a port bitmask indexed by local connection identifier and further providing CID indexed by MID; and
   said output translation lookup table providing VPI/VCI in response to CID in the case of unicast cells or a single-port-multicast cells, and in response to a port identification in the case of multiport multicast cells.

19. The switch of claim 18 wherein each IOM includes only one output translation table.

20. An input-output module ("IOM") for a telecommunications switch, comprising:
   a plurality of ports;
   a first table with memory locations which contain at least one port bitmask designator indexed by a cell identifier; and
   a second table with memory locations which contain at least one VPI/VCI pair indexed by the cell identifier, said second table being shared by each port in said plurality of ports.

21. The IOM of claim 20 wherein a plurality of locations are allocated in said second table for each multiport-multicast cell.

22. The IOM of claim 21 wherein a single location is allocated in said second table for each single-port-multicast cell.

* * * * *